Patented Nov. 16, 1937

2,099,067

UNITED STATES PATENT OFFICE 2,099,067

HYDROGENATED RESIN ESTERS AND THEIR PRODUCTION

Irvin W. Humphrey, Wilmington, Del., assignor to Hercules Powder Company, Wilmington, Del., a corporation of Delaware No Drawing. Original application December 2, 1929, Serial No. 411,201. Renewed September 22, 1932. Patent No. 2,051,796, dated August 18, 1936. Divided and this application October 3, 1932, Serial No. 636,015

28 Claims. (Cl. 260—99.40)

This invention relates to hydrogenated esters of unsaturated resin acids, for example, of abietic acid, pimaric acid, the fossil resin acids, etc., and more specifically relates to the hydrogenated polyhydric alcohol esters of these acids and their production.

Hydrogenated polyhydric alcohol esters of unsaturated resin acids are found to have substantial advantages in the commercial arts over the generally known ester gums. These hydrogenated esters, for example, offer the advantage that, on exposure, coatings containing them retain their flexibility and original color for a longer period than corresponding coatings containing the non-hydrogenated polyhydric alcohol esters and at the same time they possess all of the advantageous features of the known ester gums.

The hydrogenated polyhydric alcohol esters in accordance with this invention may be produced by esterifying a hydrogenated resin acid, as for example, dihydro- or tetrahydro abietic or pimaric acid with a polyhydric alcohol, for example, propylene, or ethylene glycol, diethylene glycol, trimethylene glycol, erythritol, arabitol, xylitol, pentaerythrite, mannitol, glycerol, etc. Alternatively a resin acid, as abietic acid, hydrogenated pimaric acid, etc., may be esterified with a polyhydric alcohol and the unsaturated ester subsequently hydrogenated, which is a preferable procedure.

As a further alternative, hydrogenation may be combined with esterification, as by heating the unsaturated resin acid with a polyhydric alcohol at atmospheric or higher pressure, depending upon the boiling point of the alcohol, in the presence of a suitable catalyst, as platinum, nickel, palladium, etc., while treating with hydrogen.

As an illustration of the preparation of a hydrogenated ester by hydrogenating a polyhydric alcohol resin ester, about 2% of catalytic nickel is added to the glycerol ester of abietic acid, prepared by esterifying rosin, as such, or abietic acid with, for example, glycerol, and the ester heated to a temperature of about 250° C. under atmospheric pressure for about 15 hours while passing into the ester a current of hydrogen. The time required for hydrogenation may be shortened to about two hours by carrying out the treatment at an increased pressure, say 200 pounds to the square inch. In this manner about 70% of the double bonds may be saturated with hydrogen. In effecting the hydrogenation, the ester may, of course, be subjected to treatment in solution in an alcohol, acetic acid, ethyl acetate, an ether or the like, under pressure.

A similar reaction may be carried out at room temperature using palladium as a catalyst. In this case the glycerol ester is dissolved in a suitable solvent, for example, ethyl acetate, rendered acid by the addition of a small proportion of acid, as acetic acid. To five parts of glycerol ester of rosin dissolved in ethyl acetate, one part of palladium may be added. The solution may then be shaken in an atmosphere of hydrogen, preferably under a pressure of, say, 40–60 pounds per square inch, at room temperature, or somewhat higher, until sufficient hydrogen is absorbed. Upon filtering off the catalyst and evaporating the solvent a hydrogenated glycerol ester results, about 90% hydrogenated.

In carrying out the hydrogenation of the polyhydric alcohol esters pressures may be used from atmospheric pressure up to around 2,000 pounds per square inch. Other catalysts may also be used, among which may be mentioned platinum, cobalt, nickel-copper, etc. The temperatures may vary depending upon the properties of the substances involved and the products formed, as well as the activity of the catalyst.

Instead of preparing a glycerol ester and then hydrogenating, the resin acid may be first hydrogenated and then esterified with the polyhydric alcohol. As an illustration of this process, either the hydrogenated rosin or resin acid, as dihydro- or tetrahydro abietic acid is heated, if desired, under pressure in an autoclave, with a polyhydric alcohol, for example, glycerol or glycol either with or without an esterification catalyst such as boric anhydride. Alternatively an alkali salt of the hydrogenated acid may be treated with a halogen derivative of the alcohol, for example, a chlorohydrin such as glycolchlorhydrin or glycerol dichlorhydrin, etc.

It is also possible to effect the hydrogenation and esterification simultaneously, for example, by treating the polyhydric alcohol, the unsaturated resin acid, and a catalyst, such as nickel, palladium, or platinum, with hydrogen under pressure and at elevated temperatures.

The various alternative hydrogenation catalysts have already been referred to. The other conditions of the reaction depend upon the product desired, the reagents, etc. and may vary considerably. While specific examples involving glycerol, glycol, or their derivatives have been referred to above, it will be understood that strictly similar reactions occur using other less common polyhydric alcohols of the type noted above.

In the hydrogenation of an ester possessing two unsaturated bonds, for example, abietic esters, it is found that the ester absorbs hydrogen rather rapidly until about 1.2 double bonds of the two double bonds is saturated forming the dihydro-derivative; thereafter only a little more hydrogen may be absorbed under the usual conditions of hydrogenation. The formation of the tetrahydro-derivatives may be favored by using a solvent, or by hydrogenating for a longer period under pressure, or at higher temperature.

The hydrogenated polyhydric alcohol esters in accordance with this invention are admirably adapted as ingredients for coating compositions, as varnishes, lacquers and the like, in substitution for unsaturated resin esters and fossil resins, and in some cases are found valuable as plasticizers. Comparative tests show that films containing hydrogenated polyhydric esters of the resin acids do not become yellow or crack with aging as readily as do films containing non-hydrogenated esters. Hydrogenation of the glycerol ester, for example, is an improvement even if only 50% of the double bonds are saturated with hydrogen, but it is preferable to carry the hydrogenation as near to completion as practical, preferably at least to 75% saturation.

It will be understood that the esters in accordance with the invention may be produced from unsaturated resin acids, as contained in resins, as rosin, fossil resins, etc., or from the resin acids as such, as abietic acid, pimaric acid, etc.

This application constitutes a division of the application for United States Letters Patent heretofore filed by me, Serial No. 411,201, filed December 2, 1929, for Hydrogenated resin esters and their production, renewed Sept. 22, 1932, and has matured into Patent No. 2,051,796 dated August 18, 1936.

What I claim and desire to protect by Letters Patent is:

1. The method of preparing a hydrogenated resin acid ester of a polyhydric alcohol, which includes esterifying a hydrogenated resin acid with a polyhydric alcohol.

2. The method of preparing a hydrogenated resin acid ester of glycerol, which includes esterifying a hydrogenated resin acid with glycerol.

3. The method of preparing a hydrogenated resin acid ester of a glycol, which includes esterifying a hydrogenated resin acid with a glycol.

4. The method of preparing a hydrogenated abietic acid ester of a polyhydric alcohol, which includes esterifying hydrogenated abietic acid with a polyhydric alcohol.

5. The method of preparing a hydrogenated abietic acid ester of glycerol, which includes esterifying hydrogenated abietic acid with glycerol.

6. The method of preparing a hydrogenated abietic acid ester of a glycol, which includes esterifying hydrogenated abietic acid with a glycol.

7. The method of preparing a hydrogenated rosin acid ester of a polyhydric alcohol, which includes esterifying a hydrogenated rosin with a polyhydric alcohol.

8. The method of preparing a hydrogenated rosin acid ester of glycerol, which includes esterifying a hydrogenated rosin with glycerol.

9. The method of preparing a hydrogenated rosin acid ester of a glycol, which includes esterifying a hydrogenated rosin with a glycol.

10. The method of preparing a hydrogenated rosin acid ester of a polyhydric aliphatic alcohol, which includes esterifying a hydrogenated rosin with a polyhydric aliphatic alcohol.

11. The method of preparing a hydrogenated abietic acid ester of a glycol, which includes esterifying hydrogenated abietic acid with ethylene glycol.

12. The method of preparing a hydrogenated rosin acid ester of a glycol, which includes esterifying a hydrogenated rosin with ethylene glycol.

13. The method of preparing a hydrogenated rosin acid ester of a polyhydric alcohol, which includes esterifying a hydrogenated rosin with a polyhydric alcohol by heating under pressure.

14. The method of preparing a hydrogenated rosin acid ester of glycerol, which includes esterifying a hydrogenated rosin with glycerol by heating under pressure.

15. The method of preparing a hydrogenated rosin acid ester of a glycol, which includes esterifying a hydrogenated rosin with a glycol by heating under pressure.

16. The method of preparing a hydrogenated rosin acid ester of a polyhydric alcohol, which includes esterifying a hydrogenated rosin with a polyhydric alcohol by heating under pressure in the presence of an esterification catalyst.

17. The method of preparing a hydrogenated rosin acid ester of glycerol, which includes esterifying a hydrogenated rosin with glycerol by heating under pressure in the presence of an esterification catalyst.

18. The method of preparing a hydrogenated rosin acid ester of a glycol, which includes esterifying a hydrogenated rosin with a glycol by heating under pressure in the presence of an esterification catalyst.

19. The method of preparing a hydrogenated rosin acid ester of a polyhydric alcohol, which includes esterifying a hydrogenated rosin with a polyhydric alcohol by heating in the presence of an esterification catalyst.

20. The method of preparing a hydrogenated resin acid ester of a polyhydric alcohol, which includes simultaneously hydrogenating a rosin acid and esterifying with a polyhydric alcohol.

21. The method of preparing a hydrogenated pimaric acid ester of a polyhydric alcohol, which includes esterifying hydrogenated pimaric acid with a polyhydric alcohol.

22. The method of preparing a hydrogenated pimaric acid ester of glycerol, which includes esterifying hydrogenated pimaric acid with glycerol.

23. The method of preparing a hydrogenated pimaric acid ester of a glycol, which includes esterifying hydrogenated pimaric acid with ethylene glycol.

24. As a new product a polyhydric alcohol ester of a tetrahydro rosin acid.

25. As a new product a polyhydric alcohol ester of a hydrogenated pimaric acid.

26. As a new product a polyhydric alcohol ester of a rosin acid having a hydrogen saturation of about 50 percent to about 75 percent.

27. As a new product a polyhydric alcohol ester of a tetrahydro resin acid.

28. As a new product a polyhydric alcohol ester of abietic acid having a hydrogen saturation of about 50 percent to about 75 percent.

IRVIN W. HUMPHREY.